United States Patent
Jung et al.

(10) Patent No.: US 10,038,687 B2
(45) Date of Patent: Jul. 31, 2018

(54) DEVICES AND CONTROL METHOD THEREOF AND APPLICATION LOGIN SYSTEM

(71) Applicant: LG ELECTRONICS INC., Seoul (KR)

(72) Inventors: Hansam Jung, Seoul (KR); Jaeryong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 15/027,973

(22) PCT Filed: Apr. 2, 2014

(86) PCT No.: PCT/KR2014/002843
§ 371 (c)(1),
(2) Date: Apr. 7, 2016

(87) PCT Pub. No.: WO2015/064858
PCT Pub. Date: May 7, 2015

(65) Prior Publication Data
US 2016/0241543 A1    Aug. 18, 2016

(30) Foreign Application Priority Data
Oct. 30, 2013    (KR) .................. 10-2013-0130033

(51) Int. Cl.
| | | |
|---|---|---|
| *H04L 9/32* | (2006.01) | |
| *H04L 29/06* | (2006.01) | |
| *G06F 21/35* | (2013.01) | |
| *H04W 12/06* | (2009.01) | |
| *G06F 17/30* | (2006.01) | |

(52) U.S. Cl.
CPC ...... *H04L 63/083* (2013.01); *G06F 17/30312* (2013.01); *G06F 21/35* (2013.01); *H04W 12/06* (2013.01); *H04L 63/0428* (2013.01); *H04L 63/0853* (2013.01)

(58) Field of Classification Search
CPC .................................................. H04L 63/083
USPC ....................................................... 713/168
See application file for complete search history.

(56) References Cited

U.S. PATENT DOCUMENTS

| | | | |
|---|---|---|---|
| 2006/0117158 A1* | 6/2006 | Shionoya | G06Q 90/00 711/164 |
| 2008/0102793 A1 | 5/2008 | Ananthanarayanan et al. | |
| 2008/0289030 A1* | 11/2008 | Poplett | G06F 21/31 726/15 |
| 2009/0293119 A1 | 11/2009 | Jonsson | |
| 2011/0030040 A1 | 2/2011 | Ronchi et al. | |
| 2011/0219427 A1 | 9/2011 | Hito et al. | |
| 2011/0265149 A1* | 10/2011 | Ganesan | H04L 9/3226 726/4 |
| 2012/0216044 A1* | 8/2012 | Chung | H04L 63/061 713/182 |
| 2012/0254987 A1 | 10/2012 | Ge et al. | |

(Continued)

*Primary Examiner* — Peter C Shaw
(74) *Attorney, Agent, or Firm* — Birch, Stewart, Kolasch & Birch, LLP

(57) ABSTRACT

The present invention relates to a terminal and a control method thereof which automatically log in to an application, which is installed on a common smart apparatus that multiple users use, using a personal smart device used by an individual such as a smart phone.

10 Claims, 15 Drawing Sheets

(56) References Cited

U.S. PATENT DOCUMENTS

| | | | |
|---|---|---|---|
| 2014/0173695 A1* | 6/2014 | Valdivia | G06F 21/36 726/4 |
| 2014/0280983 A1* | 9/2014 | Paluch | H04L 67/14 709/227 |
| 2014/0317410 A1* | 10/2014 | Yamaguchi | H04L 63/08 713/171 |

* cited by examiner

DEVICES AND CONTROL METHOD THEREOF AND APPLICATION LOGIN SYSTEM

CROSS REFERENCE TO RELATED APPLICATIONS

This application is the National Phase of PCT/KR2014/002843 filed on Apr. 2, 2014, which claims priority under 35 U.S.C. § 119(a) to Korean Patent Application No. 10-2013-0130033 filed on Oct. 30, 2013, all of which are hereby expressly incorporated by reference into the present application.

TECHNICAL FIELD

The present invention relates to a device, and more particularly, to devices, a method of controlling the same and an application log in system.

BACKGROUND ART

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Terminals may be generally classified as mobile/portable terminals or stationary terminals according to their mobility. Mobile terminals may also be classified as handheld terminals or vehicle mounted terminals according to whether or not a user can directly carry the terminal.

Efforts are ongoing to support and increase the functionality of mobile terminals. Such efforts include software and hardware improvements, as well as changes and improvements in the structural components.

Recently, numerous applications are used through the popularly released smart devices. Most of the numerous applications provide user-customized services in a manner of receiving an input of account information and then distinguishing a user currently using the corresponding application.

Hence, a single user can use a number of accounts according to applications that are used, whereby it is actually getting difficult to manage or administer account information correspondingly.

Particularly, among applications installed on common smart devices (e.g., smart TV, etc.) that can be used by multiple users instead of being used by a single user, when an application is operable only if user's account information is inputted, it is inconvenient for users to input account informations of their own each time in order to use such an application.

DISCLOSURE OF THE INVENTION

Technical Task

The technical task of the present invention is to devices for automatically logging in to an application installed on a common smart device used by multiple users using such a personal smart device used personally as a smartphone, method for controlling the same.

Technical Solutions

In one technical aspect of the present invention, provided herein is a first device corresponding to a common smart device, including a display unit configured to display information, a wireless communication unit configured to perform a communication by being paired with a second device, a memory configured to store at least one application, an account information for a login of the at least one application and a first security code by mapping the account information and the first security code to each other, a controller configured to receive a second security code from the second device via the wireless communication unit, and when the second security code matches the first security code, the controller configured to log in to the at least one application using the account information mapped to the first security code.

In another technical aspect of the present invention, provided herein is a method of controlling a second device corresponding to a personal smart device, including a display unit configured to display information, a wireless communication unit configured to perform a communication by being paired with at least one external terminal, a memory configured to store an account information for a login of the at least one application installed on the external terminal and a first security code by mapping them to each other, and a controller configured to receive a second security code from the external terminal, when the second security code matches the first security code, the controller to transmit the account information to the external terminal in order for the external terminal to automatically log in to the at least one application using the account information mapped to the first security code.

In another further technical aspect of the present invention, provided herein is an application log in system, including a first device configured to store at least one application, an account information for a login of the at least one application and a first security code by mapping the account information and the first security code to each other, and a second device configured to perform a communication by being paired with the second device and transmit a second security code to the first device, wherein when the received second security code matches the first security code, the first device logs in to the at least one application using the account information mapped to the first security code.

Advantageous Effects

According to the present invention, devices, method for controlling the same and an application log in system can provide an effect of automatically logging in to an application installed on a common smart device used by multiple users using a personal smart device personally used like a smartphone.

Effects obtainable from the present invention are non-limited by the above mentioned effect. And, other unmentioned effects can be clearly understood from the following description by those having ordinary skill in the technical field to which the present invention pertains.

BEST MODE FOR INVENTION

In the following detailed description, reference is made to the accompanying drawing figures which form a part hereof, and which show by way of illustration specific embodiments of the invention.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

A first and second devices described in the present specification includes every smart device capable of inter-terminal wireless communications and installation and execution of various applications of providing specific functions. Examples of such a terminal include at least one of a mobile phone, a mobile terminal, a smart phone, a smart home appliance device, a smart TV, a laptop computer, a desktop computer, a digital broadcast receiver, a PDA (personal digital assistants), a PMP (portable multimedia player), a navigator and the like.

Moreover, as a first and second devices described in the present specification is a smart device available for multiple users in a public place, the multiple users can use various applications installed on the smart device.

In the following description, a first device on which at least two applications are installed shall be named a smart device. And, a second device configured to send security codes for auto logins of the applications installed on the smart device shall be named a mobile terminal.

Of course, devices according to the present invention are non-limited by the smart device and the mobile device. For example, an operation of the smart device can be performed by the mobile terminal and an operation of the mobile terminal can be performed by the smart device.

In particular, as mentioned in the foregoing description, devices configured to perform an auto login operation of an application may include every smart device capable of inter-terminal wireless communications and installation and execution of various applications of providing specific functions as well as the smart device and the mobile terminal.

First of all, a configuration of a mobile terminal is described in detail with reference to FIGS. 1 to 4 as follows.

Figure 1:
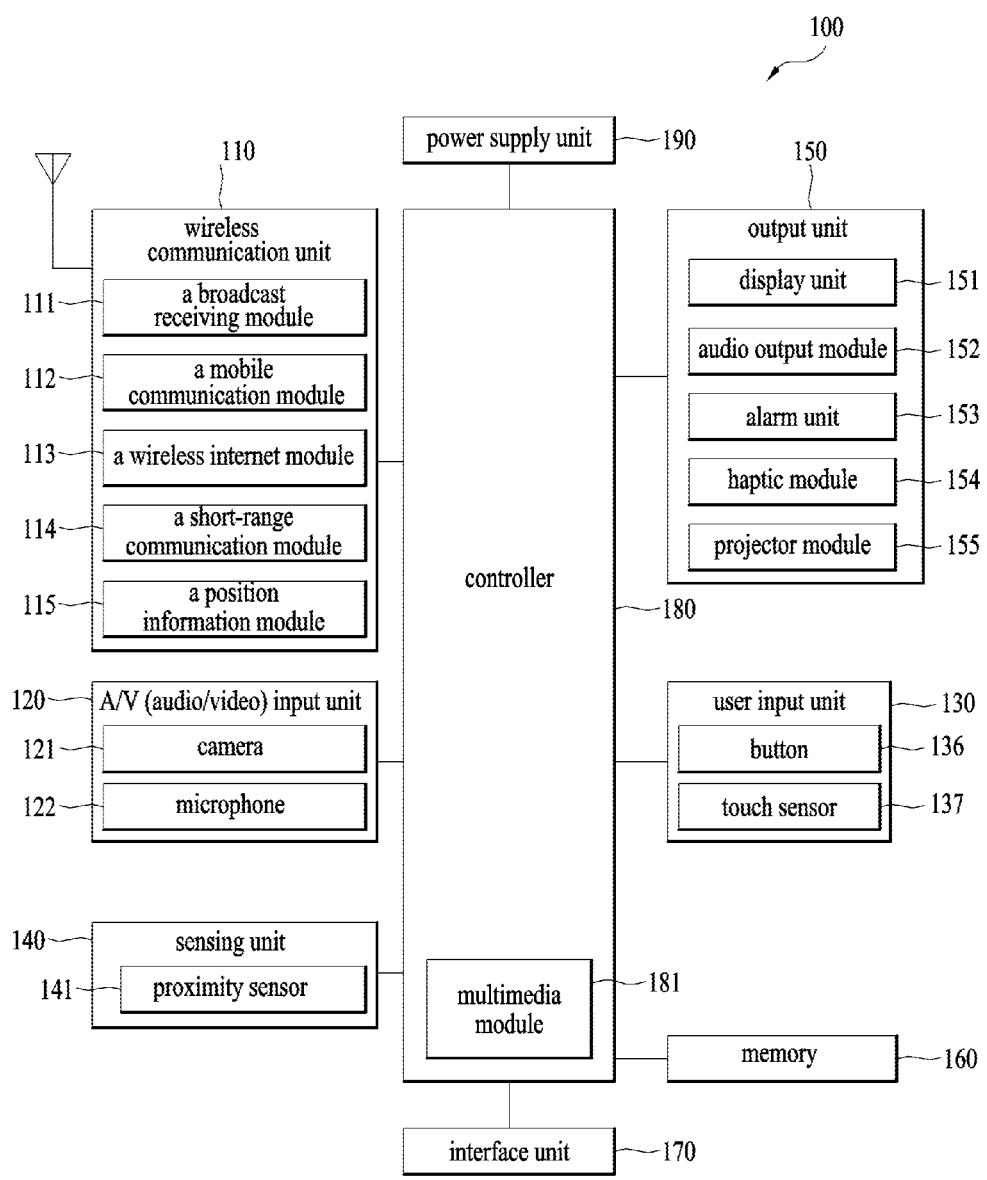
FIG. 1 is a block diagram of a mobile terminal related to one embodiment of the present invention.

FIG. 1 is a block diagram of a mobile terminal related to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position information module 115 and the like.

Moreover, the wireless communication unit 110 accesses a same network accessed by the smart device and is then paired with the smart device, under the control of the controller 180. Subsequently, the wireless communication unit 110 performs a communication for an auto login operation of an application according to the present invention under the control of the controller 180. For instance, the wireless communication unit 110 can be paired with the smart device currently connected to at least one network selected from a W-Fi network, a DLNA network, a Bluetooth network, a Zigbee network, an NFS network, a DLNA (digital living network alliance) network, and an NFC (near field communication) network, each of which is currently accessed by the smart device.

The broadcast receiving module 111 receives a broadcast signal and/or broadcast associated information from an external broadcast managing server via a broadcast channel. The broadcast channel may include a satellite channel and a terrestrial channel. At least two broadcast receiving modules may be provided to the mobile terminal 100 for the simultaneous broadcast receptions on at least two broadcast channels or the broadcast channel switching for at least two broadcast channels.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc.

And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

Moreover, the mobile communication module 112 is paired with the smart device by accessing the network accessed by the smart device under the control of the controller 180, and then performs a communication for an auto login operation of an application according to the present invention under the control of the controller 180.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

Moreover, the wireless internet module 113 is paired with the smart device by accessing the network accessed by the smart device under the control of the controller 180, and then performs a communication for an auto login operation of an application according to the present invention under the control of the controller 180.

The short-range communication module 114 is configured to facilitate short-range communications. Suitable technologies for implementing such short-range communications include BLUETOOTH, Radio Frequency IDentification (RFID), Infrared Data Association (IrDA), Ultra-WideBand (UWB), ZigBee, Near Field Communication (NFC).

Moreover, the short range communication module 114 is paired with the smart device by accessing the network accessed by the smart device under the control of the controller 180, and then performs a communication for an auto login operation of an application according to the present invention under the control of the controller 180.

The position information module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices.

The user input unit 130 comprises a button 136 located on a front/rear surface or a side surface of the mobile terminal and a touch sensor (e.g., static pressure/capacitance). Moreover, the user input unit 130 may include a keypad, a dome switch, a jog wheel and a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor 137 can be configured as a touch film, a touch sheet, a touchpad or the like.

The touch sensor 137 can be configured to convert a pressure applied to a specific portion of the display unit 151 or a variation of a capacitance generated from a specific portion of the display unit 151 to an electric input signal. Moreover, it is able to configure the touch sensor 137 to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Figure 2:
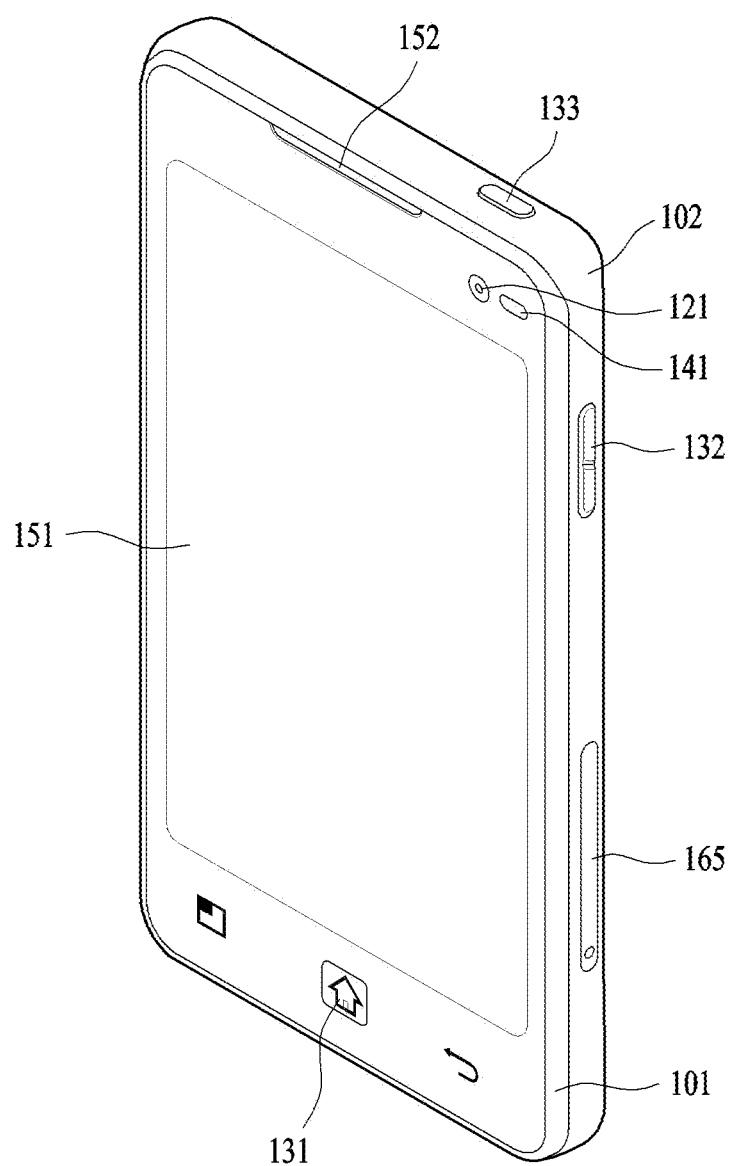
FIG. 2 is a front perspective diagram of a mobile terminal related to one embodiment of the present invention.

Referring to FIG. 2, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor 141 has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160.

During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal.

The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

Moreover, an operating system equal to or different from that of the smart device is installed on the memory 160. And, at least two applications for providing specific functions are installed on the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

The battery may include a built-in battery configured rechargeable and can be detachably combined with the terminal body for charging and the like. And, a connecting port can be configured as one example of the interface 170 to which an external charger for supplying power for the battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram for one example of a mobile terminal related to the present invention.

The mobile terminal 100 shown in the drawing has a bar type terminal body, by which the present invention is non-limited. And, the present invention is applicable to a variety of different configurations such as a folder type, a slide type, a swing type, a swivel type, and the like, in each of which at least two bodies are combined to be relatively movable.

The body of the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

In some cases, electronic components or parts can be mounted on a surface of the rear case 102. The electronic components or parts mounted on the surface of the rear case 102 may include such a detachable part as a battery, a USIM card, a memory card and the like. In this case, the rear case 102 may further include a rear cover 103 configured to cover the surface of the rear case 102. In particular, the backside cover 103 has a detachable configuration for user's convenience. If the rear cover 103 is detached from the rear case 102, the surface of the rear case 102 is exposed.

Figure 3:
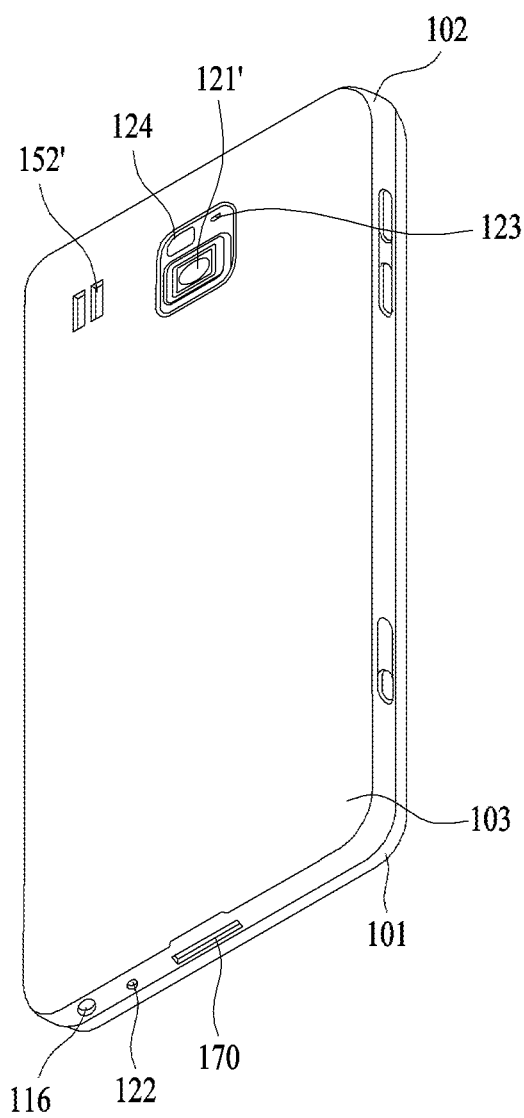
FIG. 3 is a rear perspective diagram of a mobile terminal related to one embodiment of the present invention.

If the rear cover 103 is attached to the rear case 102, as shown in FIG. 3, a lateral side of the rear case 102 may be exposed in part. If a size of the rear cover 103 is decreased, a backside of the rear case 102 may be exposed in part. If the rear cover 103 covers the whole backside of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 170 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

FIG. 3 is a perspective diagram of a rear side of the terminal shown in FIG. 2.

Referring to FIG. 3, a camera 121' can be additionally provided to a rear side of the terminal body, and more particularly, to the rear case 102. The camera 121 has a photographing direction that is substantially opposite to that of the former camera 121 shown in FIG. 2 and may have pixels differing from those of the former camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed in the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (selfie) using the camera 121', the mirror 124 enables the user to view user's face reflected by the mirror 124.

An additional audio output unit 152' can be provided to the rear side of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
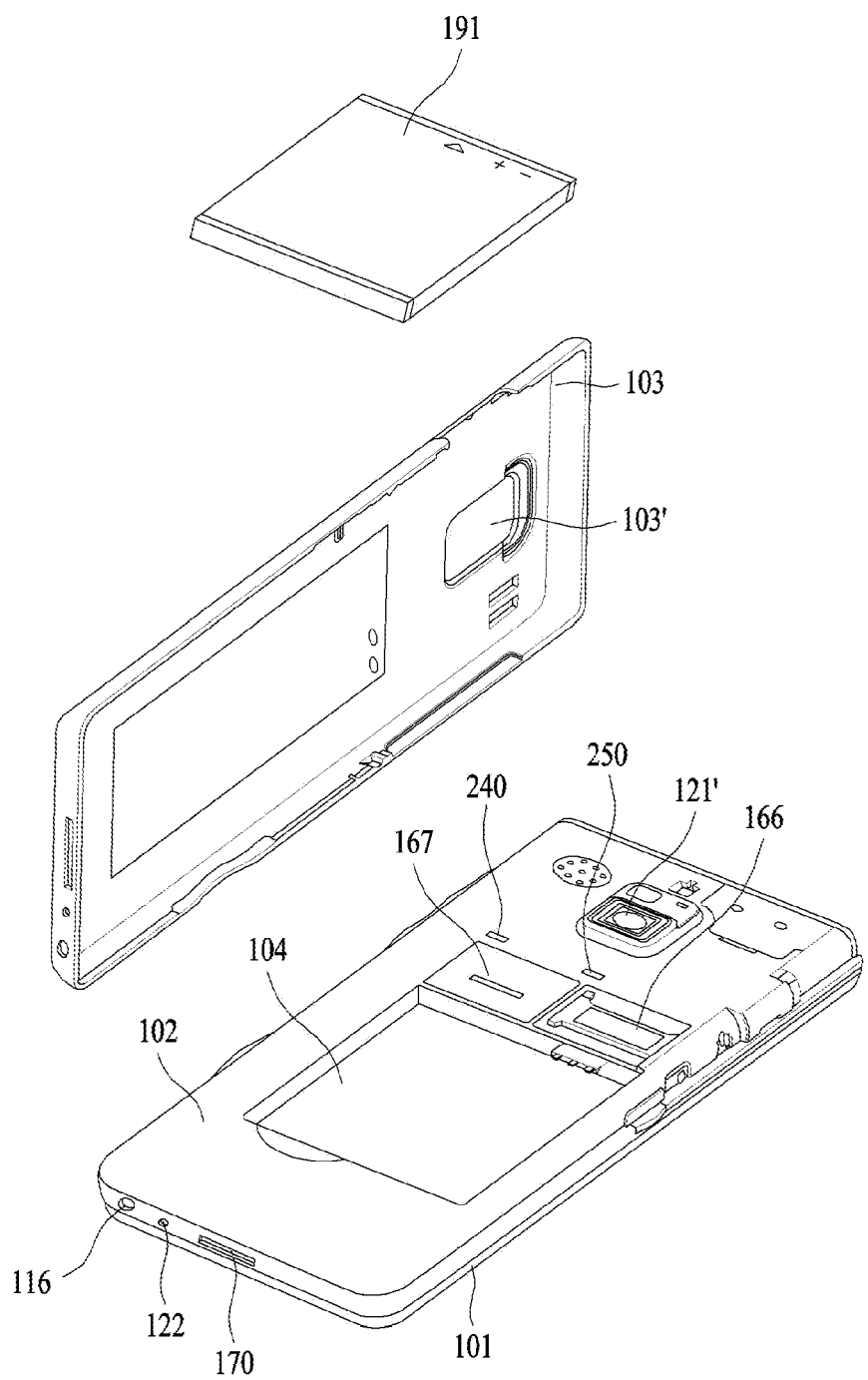
FIG. 4 is a rear exploded perspective diagram of a mobile terminal related to one embodiment of the present invention.

FIG. 4 is a rear exploded perspective diagram of a surface of a rear case by separating a rear cover of a mobile terminal according to one embodiment of the present invention.

Referring to FIG. 4, a front case 101, a rear case 102, a rear cover (or a battery cover) 103, a camera 121', and interface 170, a microphone 122, a speaker module 154, an audio output unit 152', a battery 191, a battery loading part, a USIM card loading part 166, and a memory card loading part 167 are illustrated.

A space for mounting such external parts as the battery loading part 104, the USIM card loading part 105 and the memory card loading part 106 can be provided to a surface of the rear case 102. Generally, the external components or parts mounted on the surface of the rear case 102 are provided to expand functions of the mobile terminal 100 in order to meet the diversified functions of the mobile terminal 100 and the diversified needs of consumers.

As the performance of the mobile terminal 100 is diversified, the battery 191 can be configured with a replaceable type shown in FIG. 4 in order to complement the considerable power consumption. In case of the replaceable type, the battery loading part 104 is formed on the surface of the rear case 102 in order for a user to load/unload the battery 191. And, a connection terminal is provided to the battery loading part 104 in order to be electrically connected the parts or components installed in the case.

The USIM card loading part 166 or the memory card loading part 167 may be formed, as shown in FIG. 4, near the battery loading part 104. Alternatively, the USIM card loading part 166 or the memory card loading part 167 may be formed on a bottom surface of the battery loading part 104 so as to be externally exposed in case of unloading the battery 191 from the battery loading part 104. In this case, as a size of the battery loading part 104 can be increased, a size of the battery 191 can be increased as well.

Although FIG. 4 shows the configuration that the USIM card loading part 166 or the memory card loading part 167 is provided to the rear side of the rear case 102, the USIM card loading part 166 or the memory card loading part 167 of an insertion type may be formed in a lateral side of the mobile terminal 100.

The rear cover 103 covers the surface of the rear case. Hence, the rear cover 103 fixes the battery 191, the USIM card, the memory card and the like, which are mounted on the surface of the rear case 102, not to be separated or detached and also protects the external parts or components from external shocks or particles. Recently, a waterproof structure (not shown in the drawing) can be further included to provide a waterproof function between the rear case 102 and the rear cover 103 assembled together in order to prevent water from flowing into the external parts.

Figure 5:
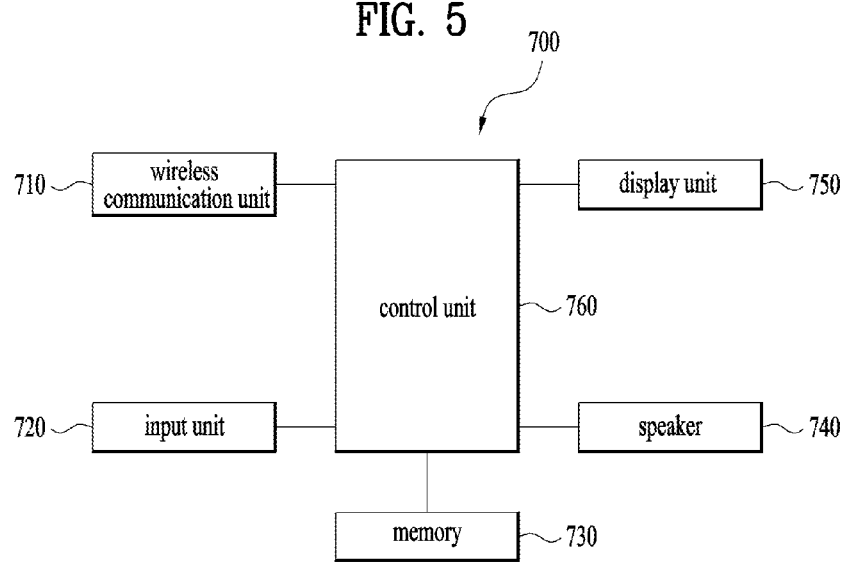
FIG. 5 is a block diagram of a smart device related to one embodiment of the present invention.

FIG. 5 is a block diagram of a smart device related to one embodiment of the present invention.

Referring to FIG. 5, a smart device 700 according to the present invention may include a wireless communication unit 710, an input unit 720, a memory 730, a speaker 740, a display unit 750 and a control unit 760.

Of course, the smart device 700 can be identically equipped with the components mentioned in the foregoing description of the mobile terminal 100 as well as with the above mentioned components. In particular, the smart device 700 is provided as a mobile terminal and can have the same components of the mobile terminal 100 shown in FIG. 1.

The wireless communication unit 710 is paired with the mobile terminal 100 by accessing the same network of the mobile terminal 100 according to the present invention and performs a communication for an auto login operation of an application according to the present invention under the control of the control unit 760.

Like the wireless communication unit 110 of the mobile terminal 100 shown in FIG. 1, the above-configured wireless communication unit 710 may include a mobile communication module, a wireless internet module and a short range communication module, each of which enables a communication between the mobile terminal 100 and the smart device 700.

The input unit 720 generates a key signal for an operation control of the smart device 700. In some cases, the input unit 720 may include at least one of a keypad, a dome switch, a touchpad (static pressure/electrostatic), a jog wheel, a jog switch, a mouse, a remote controller and the like.

The memory 730 can store a program for an operation of the smart device 700. Various data such as a video file, an audio file, an image file and the like are saved in the memory 730. An operating system equal to or different from that of the mobile terminal 100 is installed on the memory 730. And, at least two applications capable of providing specific functions are installed on the memory 730.

The speaker 740 outputs audio related contents saved in the memory 730 and audio related contents received through the wireless communication unit 710.

The display unit 750 displays information processed or handled by the smart device 700. The above-configured display unit 750 may include at least one of a liquid crystal display (LCD), a thin film transistor-liquid crystal display (TFT LCD), an organic light-emitting diode (OLED), a flexible display and a 3D display. And, the display unit 750 may be configured as a touchscreen by being combined with a touch sensor.

The control unit 760 controls overall operations of the smart device 700. According to the present invention, the control unit 760 controls an operation of performing an auto login of at least one of applications installed on the memory 160 by interworking with an operation of the mobile terminal 100.

Figure 6:
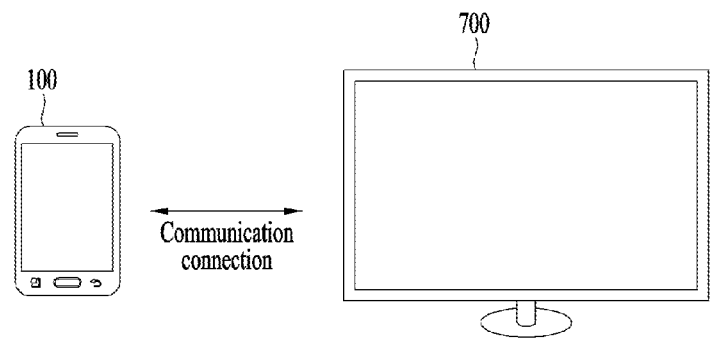
FIG. 6 is a diagram to describe a system including a portable terminal and at least one external device according to the present invention.

FIG. 6 is a diagram to describe a system including a portable terminal and at least one external device according to the present invention.

Referring to FIG. 6, according to the present invention, if the mobile terminal 100 accesses a specific network currently accessed by the smart device 700 such as a smart TV and is then paired with the smart device 700 initially, the mobile terminal 100 creates a security code for an auto login of at least one application installed on the smart device 700 and then sends the created security code to the smart device 700.

After the security code has been received from the mobile terminal 100, if an account information (ID/PASSWORD) of a user of the mobile terminal 100 for the at least one application is set on a screen, the smart device 700 saves the security code and the set account information to the memory 730 by mapping them to each other.

Thereafter, if the mobile terminal 100 is paired with the smart device 700 again, the mobile terminal 100 sends the security code to the smart device 700 again. Subsequently, the smart device 700 automatically logs in to the corresponding application using the account information mapped to the security code received from the mobile terminal 100 in the memory 730.

Moreover, according to the present invention, if the mobile terminal 100 accesses a specific network currently accessed by the smart device 700 such as a smart TV and is then paired with the smart device 700 initially, the mobile terminal 100 creates a security code for an auto login of at least one application installed on the smart device 700 and then sends the created security code to the smart device 700.

Thereafter, if the mobile terminal 100 is paired with the smart device 700 again, the mobile terminal 100 sends the security code to the smart device 700 again. If a signal of requesting an account information of at least one application installed on the smart device 700 is received from the smart device 700, the mobile terminal 100 sends an account information of the application corresponding to the received request signal to the smart device 700 in order for the smart device 700 to log in to the application corresponding to the request signal.

In doing so, the security code created by the mobile terminal 100 may include at least one of an electronic serial number of the mobile terminal 100, a code set up by a user of the mobile terminal 100, and a password set for the mobile terminal 100.

Moreover, according to the present invention, if the mobile terminal 100 accesses a specific network currently accessed by the smart device 700 such as a smart TV and is then paired with the smart device 700 initially, the mobile terminal 100 receives a security code created by the smart device 700 and a list of at least one application installed on the smart device 700.

Subsequently, if a user's account information on the at least one application in the received list is set up, the mobile terminal 100 saves the received security code and the set account information to the memory 160 by mapping them to each other.

Thereafter, if the mobile terminal 100 is paired with the smart device 700 again and the security code is received from the smart device 700, the mobile terminal 100 searches the memory 160 for the account information of the at least one application mapped to the security code. If the corresponding account information is found, the mobile terminal sends the found account information to the smart device 700 in order for the smart device 700 to automatically log in to the corresponding application using the found account information.

In doing so, the security code created by the smart device 700 may include at least one of an electronic serial number of the smart device 700, a code set up by a user of the mobile terminal 100 or a user of the smart device 700, and a password set for the smart device 700.

In the following description, with reference to FIGS. 7 to 17, embodiments of a process for automatically logging in to at least one application installed on the smart device 700 used by multiple users using the mobile terminal 100 according to the present invention are described in detail.

The embodiments mentioned in the following description may be associated with each other. In order to clearly describe the present invention, according to the embodiments mentioned in the following description, an account information for a login of at least one application installed on the smart device 700 is administered by the smart device 700 or the mobile terminal 100. Hence, the embodiments mentioned in the following description can be implemented in a manner of being combined with each other entirely or in part.

First Embodiment

According to a first embodiment of the present invention, a process is described as follows. First of all, the smart device 700 administers a user account information of the mobile terminal 100 for a login of at least one application installed on the smart device 700. If the smart device 700 is paired with the mobile terminal 100, the smart device 700 logs in to the corresponding application using the user account information of the mobile terminal 100 saved in the smart device 700.

A first embodiment of the present invention is described in detail with reference to FIGS. 7 to 11 as follows.

Figure 7:
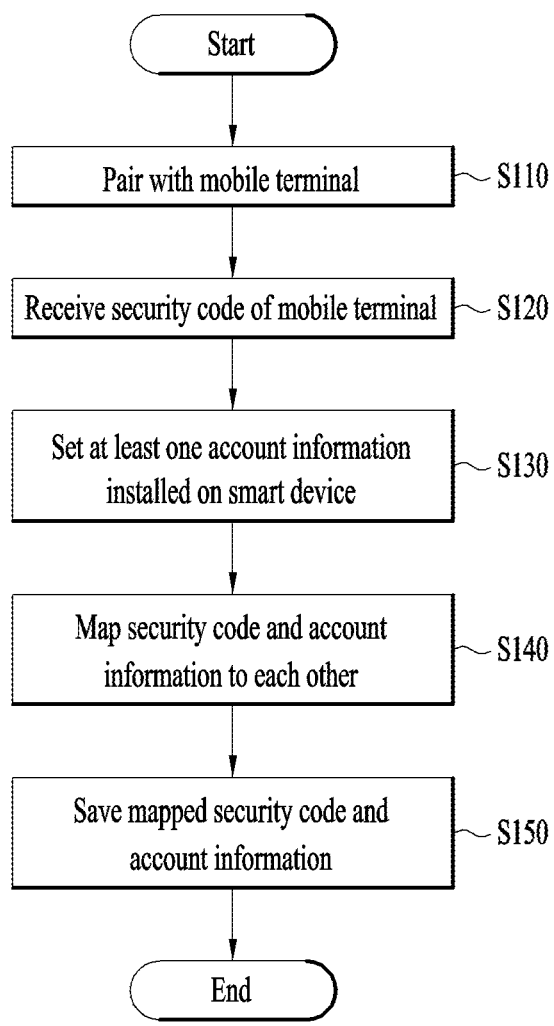
FIG. 7 is a flowchart of a process for setting a user account information of a mobile terminal for logging in to at least one application installed on a smart device in the smart device according to a first embodiment of the present invention.
Figure 8:
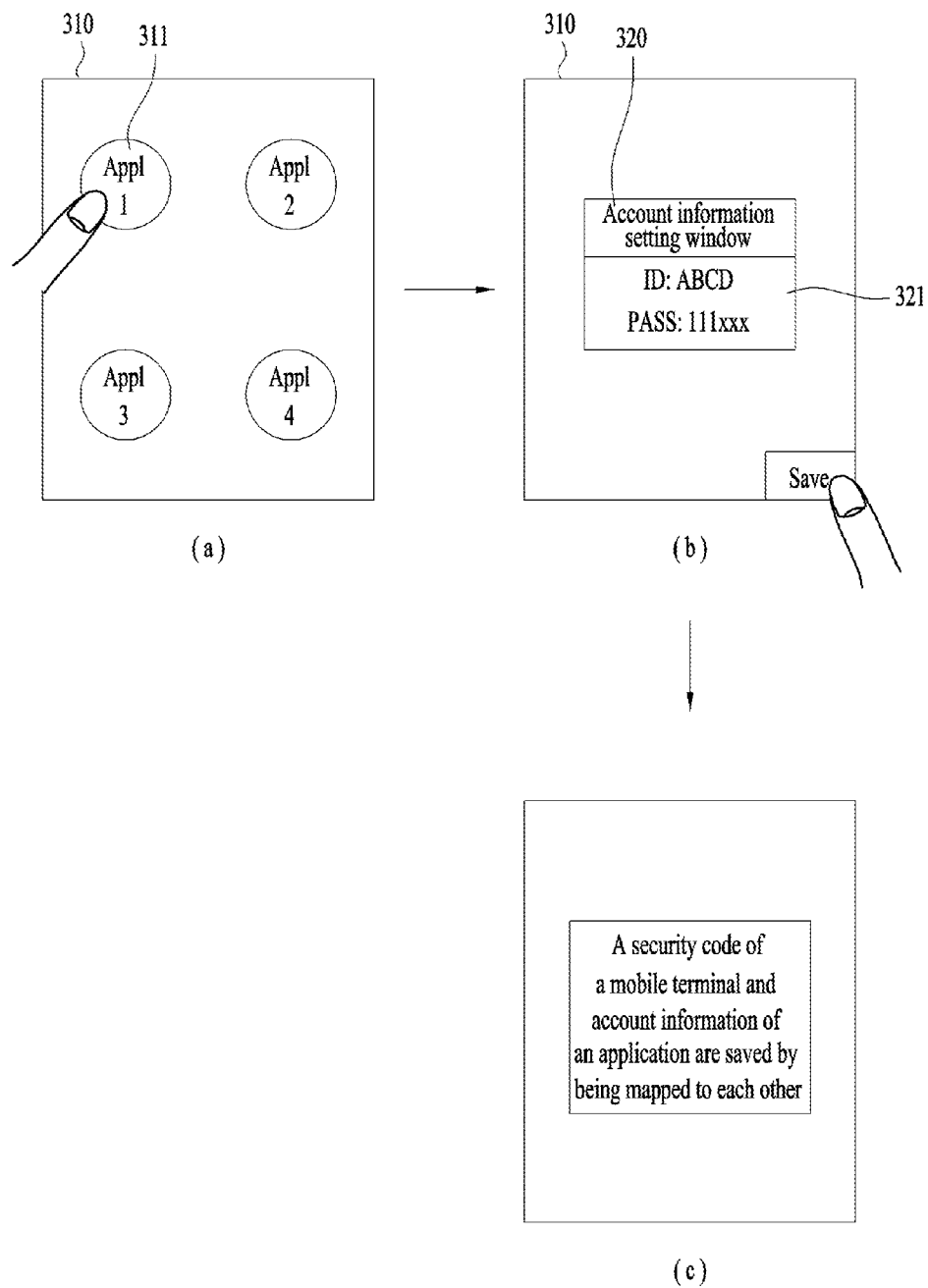
FIG. 8 is a diagram to describe a process for setting a user account information of a mobile terminal for logging in to at least one application installed on a smart device in the smart device according to a first embodiment of the present invention.

First of all, with reference to FIG. 7 and FIG. 8, a process for setting a user account information of the mobile terminal 100, which is provided for a login of at least one application installed on the smart device 700, in the smart device 700 is described in detail.

FIG. 7 is a flowchart of a process for setting a user account information of a mobile terminal for logging in to at least one application installed on a smart device in the smart device according to a first embodiment of the present invention.

FIG. 8 is a diagram to describe a process for setting a user account information of a mobile terminal for logging in to at least one application installed on a smart device in the smart device according to a first embodiment of the present invention.

Referring to FIG. 7 and FIG. 8, while the control unit 760 of the smart device 700 is connected to a specific network through the wireless communication unit 710, as the mobile terminal 100 is connected to the specific network, if the smart device 700 is initially paired with the mobile terminal 100 [S110], the control unit 760 sends a request signal for a security code to the mobile terminal 100 through the wireless communication unit 710. In response to the request signal, the smart device 700 receives the security code from the mobile terminal 100 [S120].

In this case, the specific network may include one of a Wi-Fi network, a DLNA network, a Bluetooth network, a Zigbee network, an NGS network, a DLNA (digital living network alliance) network, and an NFC (near field communication) network.

Moreover, the security code of the mobile terminal 100 is a key for the smart device 700 to uniquely identifying the mobile terminal 100, and is able to include at least one of an electronic serial number of the mobile terminal 100, a code set up by a user of the mobile terminal 100, and a password set for the mobile terminal 100.

Moreover, the security code received from the mobile terminal 100 may include a code encrypted by the mobile terminal 100 to prevent external hacking. In this case, the control unit 760 can decrypt the encrypted security code received from the mobile terminal 100 using a decryption information previously provided to the memory 730 or a decryption information previously received from the mobile terminal 100.

If the security code is received from the mobile terminal 100 and an account information for a login of at least one application set for the smart device 700 is set up by a user of the smart device 700 or a user of the mobile terminal 100 [S130], the control unit 760 maps the set account information and the received security code to each other [S140] and then saves the mapped account information and the mapped security code to the memory 730 [S150].

For instance, if the control unit 760 displays objects (e.g., icons), which are provided to execute applications installed on the smart device 700, on a screen 310 of the display unit 750 and at least one object 311 is then selected from the displayed objects [FIG. 8 (a)], the control unit 760 displays a setting window 320, which is provided to set an account information to use for a login of an application corresponding to the selected object 311, on the screen 300 [FIG. 8 (b)].

If an account information 321 to be used for the login of the application corresponding to the selected object 311 is set through the setting window 320 by the user of the smart device 700 or the user of the mobile terminal 100, as shown in FIG. 8 (c), the control unit 760 maps the received security code and the set account information 321 to each other and then saves them to the memory 730.

In this case, the account information 321 may include at least one or two of an ID, a password, an email address, a phone number, and a resident registration number of the user.

For another instance, before the security code is received from the mobile terminal 100 in the step S120, after the smart device 700 has been paired with the mobile terminal 100, if the control unit 760 displays objects (e.g., icons), which are provided to execute applications installed on the smart device 700, on a screen 310 of the display unit 750 and at least one object 311 is then selected from the displayed objects, the control unit 760 sends a request signal for requesting the security code to the paired mobile terminal 100. If the security code is received from the mobile terminal 100, the control unit 760 can perform the step S130.

In particular, if the security code is received from the mobile terminal 100, the control unit 760 displays the setting window 320 shown in FIG. 8 (b) and then saves the account information 321 set through the setting window 320 and the security code to the memory 730 by mapping them to each other.

For further instance, before the security code is received from the mobile terminal 100 in the step S120, if the smart device 700 is paired with the mobile terminal 100, the control unit 760 sends a request signal for requesting an account information of at least one application installed on the smart device 700 and a security information to the mobile terminal 100. If the account information and the security code are received from the mobile terminal 100 in response to the request signal, the control unit 760 saves the received account information and the received security code to the memory 730 by mapping them to each other. In doing so, if the control unit 760 displays objects (e.g., icons), which are provided to execute applications installed on the smart device 700, on a screen 310 of the display unit 750 and at least one object 311 is then selected from the displayed objects, the control unit 760 sends a request signal for requesting an account information of an application corresponding to the selected object 311 and the security code to the paired mobile terminal 100. If the account information and the security code are received from the mobile terminal 100, the control unit 760 can save the received account information 321 and the received security code to the memory 730 by mapping them to each other.

In the following description, a process for automatically logging in to at least one application of the smart device 700 using the mobile terminal 100 according to the present invention is described in detail with reference to FIGS. 9 to 11.

Figure 9:
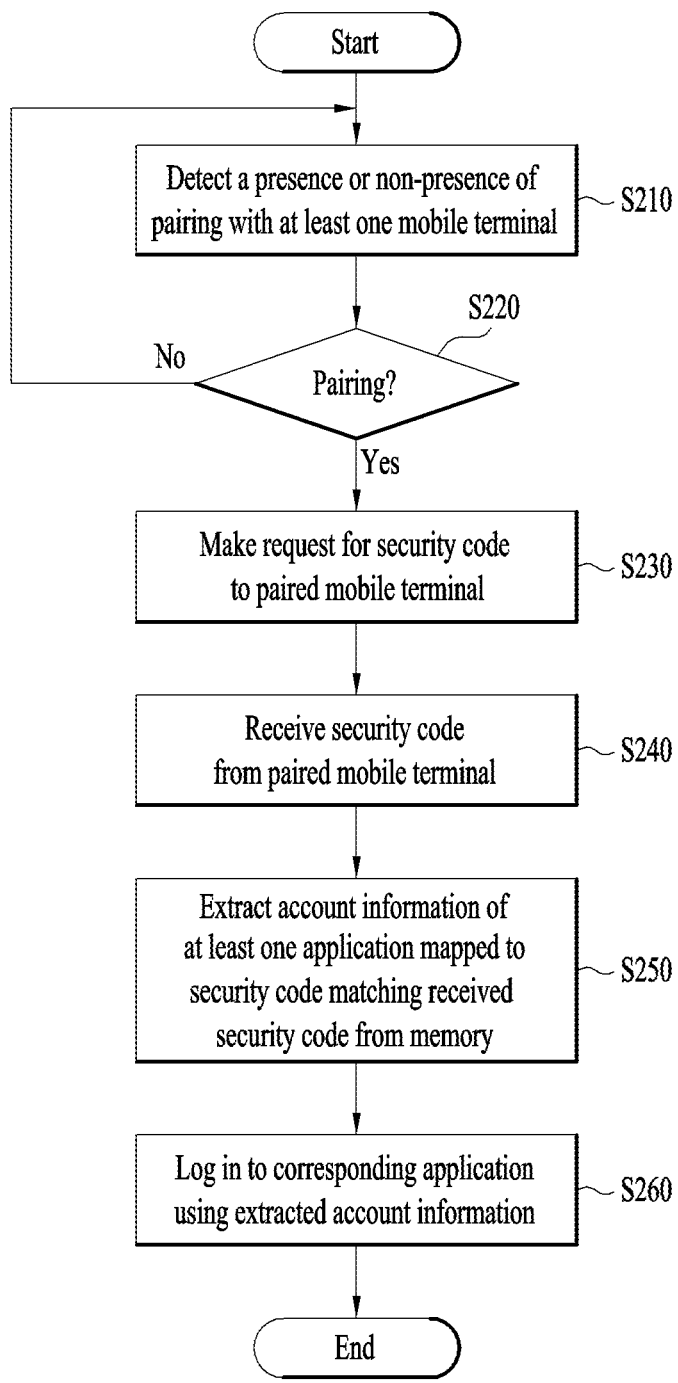
FIG. 9 is a flowchart of a process for automatically logging in to at least one application of a smart device using a mobile terminal according to the present invention.

FIG. 9 is a flowchart of a process for automatically logging in to at least one application of a smart device using a mobile terminal according to the present invention.

Figure 10:
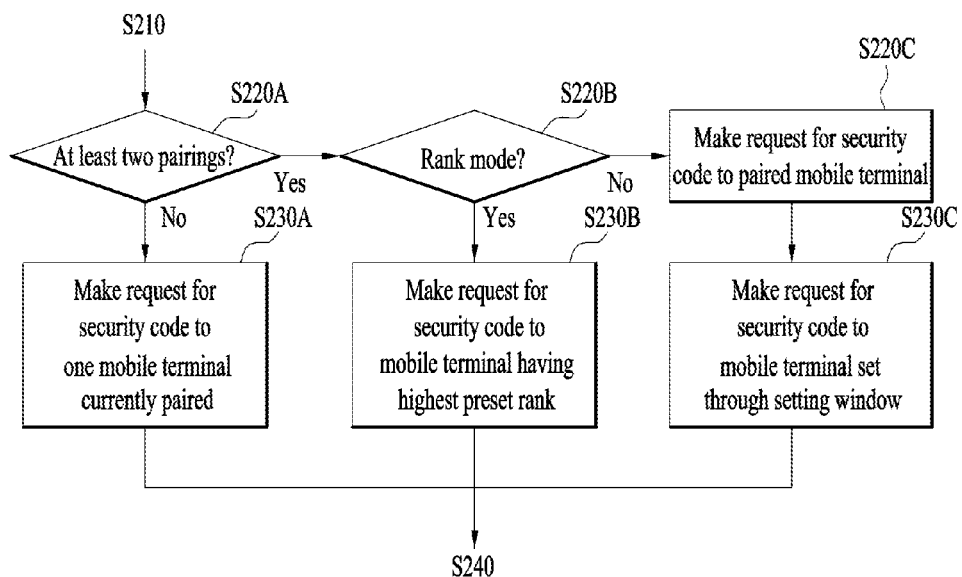
FIG. 10 is a flowchart to describe detailed steps of the steps S220 and S230 shown in FIG. 9 according to a first embodiment.

FIG. 10 is a flowchart to describe detailed steps of the steps S220 and S230 shown in FIG. 9 according to a first embodiment.

Figure 11:
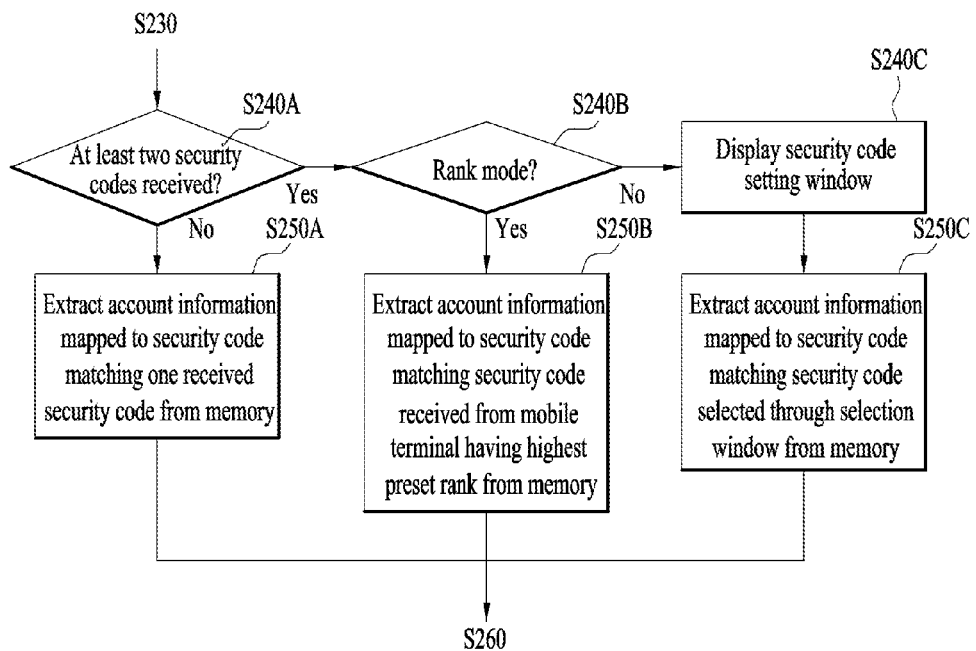
FIG. 11 is a flowchart to describe detailed steps of the steps S240 and S250 shown in FIG. 9 according to a first embodiment.

FIG. 11 is a flowchart to describe detailed steps of the steps S240 and S250 shown in FIG. 9 according to a first embodiment.

Referring to FIGS. 9 to 11, the control unit 760 of the smart device 700 detects whether the smart device 700 is currently paired with at least one mobile terminal 100 [S210]. If the smart device 700 is currently paired with the at least one mobile terminal 100 [S220], the control unit 760 of the smart device 700 makes a request for a security code to the paired at least one mobile terminal 100.

In doing so, if an attempt to log in to at least one application requiring a login among applications installed on the smart device 700 is detected or an execution command of the at least one application requiring the login is inputted, the control unit 760 can detect whether the smart device 700 is paired with the at least one mobile terminal 100. Moreover, the control unit 760 displays objects respectively indicating the applications installed on the smart device 700 on a screen of the display unit 750. If at least one object is selected from the displayed objects, the control unit 760 can detect whether the smart device 700 is paired with the at least one mobile terminal 100.

In doing so, if at least two mobile terminals 100 currently paired with the smart device 700 together or respectively exist, the control unit 760 can perform an operation shown in FIG. 10.

In particular, if at least two mobile terminals 100 currently paired with the smart device 700 together or respectively do not exist [S220A], the control unit 760 sends a request signal for a security code to a currently paired single mobile terminal 100 [S230A].

Yet, if at least two mobile terminals 100 currently paired with the smart device 700 together or respectively exist, the control unit 760 determines whether a rank used for a selection of a mobile terminal to which the security code will be requested is previously set in the memory 730 of the smart device 700.

If the rank is previously set [S220B], the control unit 760 sends the request signal for the security code to the mobile terminal having a highest previously set rank among the paired at least two mobile terminals [S230B].

In doing so, the previously set rank may include at least one of a rank in the count of the pairing between the smart device 700 and each of the paired at least two mobile terminals, a rank in the paired time between the smart device 700 and each of the paired at least two mobile terminals, a rank in the sustained time of the pairing between the smart device 700 and each of the paired at least two mobile terminals, and a priority preset for one of the paired at least two mobile terminals by a user of the smart device 700.

Meanwhile, if the rank information is not set previously, the control unit 760 displays a setting window of the mobile terminal, to which a request for sending the security code will be sent among the paired at least two mobile terminals, on the display unit 750 [S220C] and then sends the request signal for the security code to the mobile terminal set through the setting window among the paired at least two mobile terminals [S230C].

In doing so, if the setting window is displayed, the control unit 180 displays at least two first and second items respectively indicating the paired at least two first and second mobile terminals within the setting window and is also able to display the first item and the second item identifiably for the previously set ranks.

For instance, if the first mobile terminal among the paired at least two first and second mobile terminals has a highest rank for the previously set ranks, the control unit 760 can control the first item indicating the first mobile terminal to be displayed in a manner of being emphasized more than the second item indicating the second mobile terminal having a rank lower than that of the first mobile terminal. In particular, if the first item and the second item are displayed by being sorted into a list, the first item can be displayed on a line upper than that of the second item. Moreover, the control unit 760 can control the first item to be displayed in size larger than that of the second item.

Referring now to FIG. 9, in response to the request signal, if the security code is received from the mobile terminal 100 through the wireless communication unit 710 [S240], the control unit 760 searches the memory 730 for a security code matching the received security code, extracts an account information used for a login of at least one application mapped to the found security code [S250], and then performs a login operation of the application corresponding to the extracted account information using the extracted account information [S260].

In particular, by the processes shown in FIG. 7 and FIG. 8, an account information used for a login of at least one application is stored in the memory 740 by being mapped to at least one security code and the control unit 760 searches the memory 730 for a security code matching the received security code.

Moreover, the security code received in the step S240 may include a code encrypted by the mobile terminal 100 to prevent external hacking. In this case, the control unit 760 can decrypt the encrypted security code received from the mobile terminal 100 using a decryption information previously provided to the memory 730 or a decryption information previously received from the mobile terminal 100.

Moreover, before logging in to a corresponding application installed on the smart device 700 using the account information extracted by the step S250, if the mobile terminal 100 is in security mode, the control unit 760 sends the mobile terminal 100 a signal for querying whether to perform a login of the application corresponding to the extracted account information through the wireless communication unit 710. If a signal for accepting a login execution of the application corresponding to the extracted account information is received from the mobile terminal 100 in response to the query signal, the control unit 760 may perform a login operation of the corresponding application using the extracted account information.

Meanwhile, if at least two security codes are received from the currently paired at least two mobile terminals, the control unit 760 can perform an operation shown in FIG. 11.

Referring to FIG. 11, if at least two security codes are not received from the currently paired at least two mobile terminals but a security code is received from a single paired mobile terminal [S240A], the control unit 760 searches the memory 730 for a security code matching the security code received from the single paired mobile terminal and then extracts an account information sued for a login of at least one application mapped to the fond security code [S250A].

Yet, if at least two security codes are received from the currently paired at least two mobile terminals, the control unit 760 determines whether a rank used for a selection of a security code used in determining whether the received security codes match the security codes saved in the memory 730 is set previously.

If the rank is previously set [S240B], the control unit 760 determines the security code having the highest previously set rank among the received security codes, searches the memory 730 for a security code matching the determined security code, and then extracts an account information used for a login of at least one application mapped to the found security code [S250B].

In doing so, the previously set rank may include at least one of a rank in the count of the pairing between the smart device 700 and each of the paired at least two mobile terminals, a rank in the paired time between the smart device 700 and each of the paired at least two mobile terminals, a rank in the sustained time of the pairing between the smart device 700 and each of the paired at least two mobile terminals, and a priority preset for one of the paired at least two mobile terminals by a user of the smart device 700.

Moreover, if the rank information is not set previously, the control unit 760 displays a selection window of a security code, which is used to determine whether the received security codes match the security codes saved in the memory 730, on the display unit 750 [S240C], searches the memory 730 for a security code matching the security code selected through the selection window, and then extracts an account information used for a login of at least one application mapped to the found security code [S250C].

In doing so, if the selection window is displayed, the control unit 180 displays at least two first and second items respectively indicating the received security codes within the selection window and is also able to display the first item and the second item identifiably for the previously set ranks.

For instance, if the security code received from a first mobile terminal among the received security codes has a highest rank for the previously set ranks, the control unit 760 can control the first item indicating the security code received from the first mobile terminal to be displayed in a manner of being emphasized more than the second item indicating the security code received from a second mobile terminal having a rank lower than that of the first mobile terminal. In particular, if the first item and the second item are displayed by being sorted into a list, the first item can be displayed on a line upper than that of the second item. Moreover, the control unit 760 can control the first item to be displayed in size larger than that of the second item.

Moreover, although a security code matching the received security code exists in the memory 730, if an account information of at least one application is not mapped to the security code matching the received security code in the memory 730 or such an account information does not exist at all, the control unit 760 displays an account information input window of the application on the screen of the display unit 750 or sends the mobile terminal 100 a request signal for the account information of the application. If the account information of the application is inputted through the account information input window or the account information of the application is received from the mobile terminal 100, the control unit 760 saves the inputted or received account information and the received security code to the memory 730 by mapping them to each other. And, the control unit 760 performs an auto login operation of the corresponding application using the inputted or received account information.

Meanwhile, after logging in to the corresponding application by the step S260, while the pairing with the mobile terminal 100 is maintained, the control unit 760 maintains the login state of the corresponding application. If it is detected that the pairing with the mobile terminal 100 is released through the wireless communication unit 710, the control unit 760 automatically logs out from the corresponding application.

So far, the first embodiment of the present invention is described in detail with reference to FIGS. 7 to 11.

In the following, a second embodiment of the present invention is described in detail with reference to FIGS. 12 to 14.

Second Embodiment

According to a second embodiment of the present invention, a following process is described as follows. First of all, in the mobile terminal 100, a user account information for a login of at least one application installed on the smart device 700 is administered. If the mobile terminal 100 is paired with the smart device 700, the account information is sent to the smart device 700 in order for the smart device 700 to log in to a corresponding application installed on the smart device 700 using the account information.

A second embodiment of the present invention is described in detail with reference to FIGS. 12 to 14 as follows.

Figure 12:
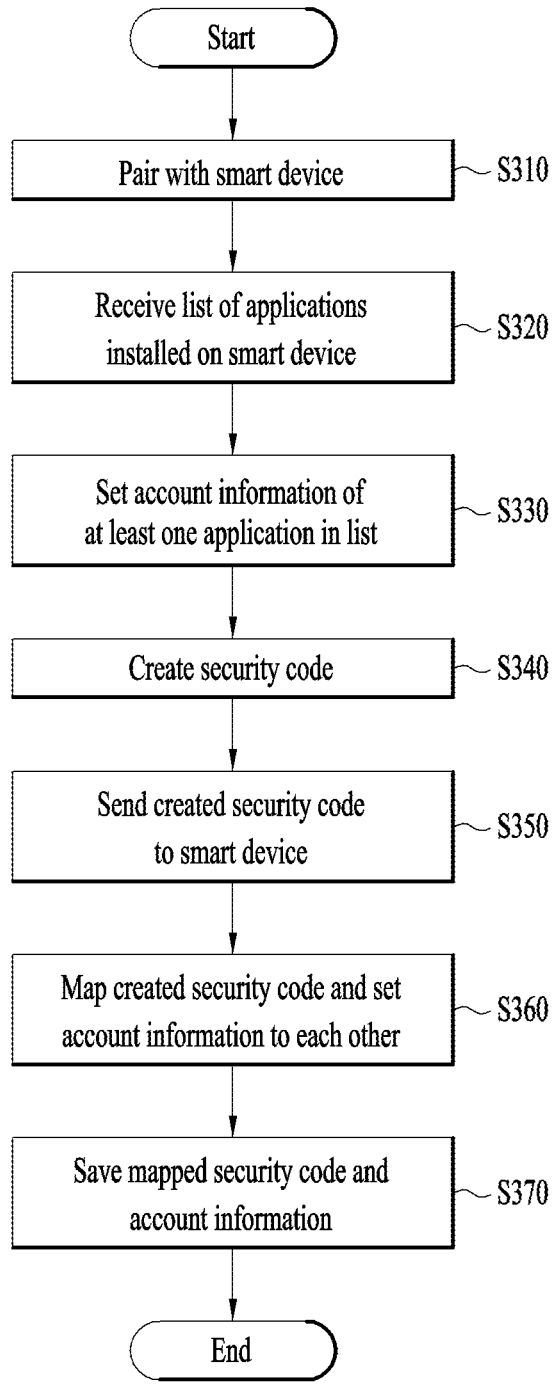
FIG. 12 is a flowchart of a process for setting a user account information of a mobile terminal for logging in to at least one application installed on a smart device in a mobile terminal according to a second embodiment of the present invention.
Figure 13:
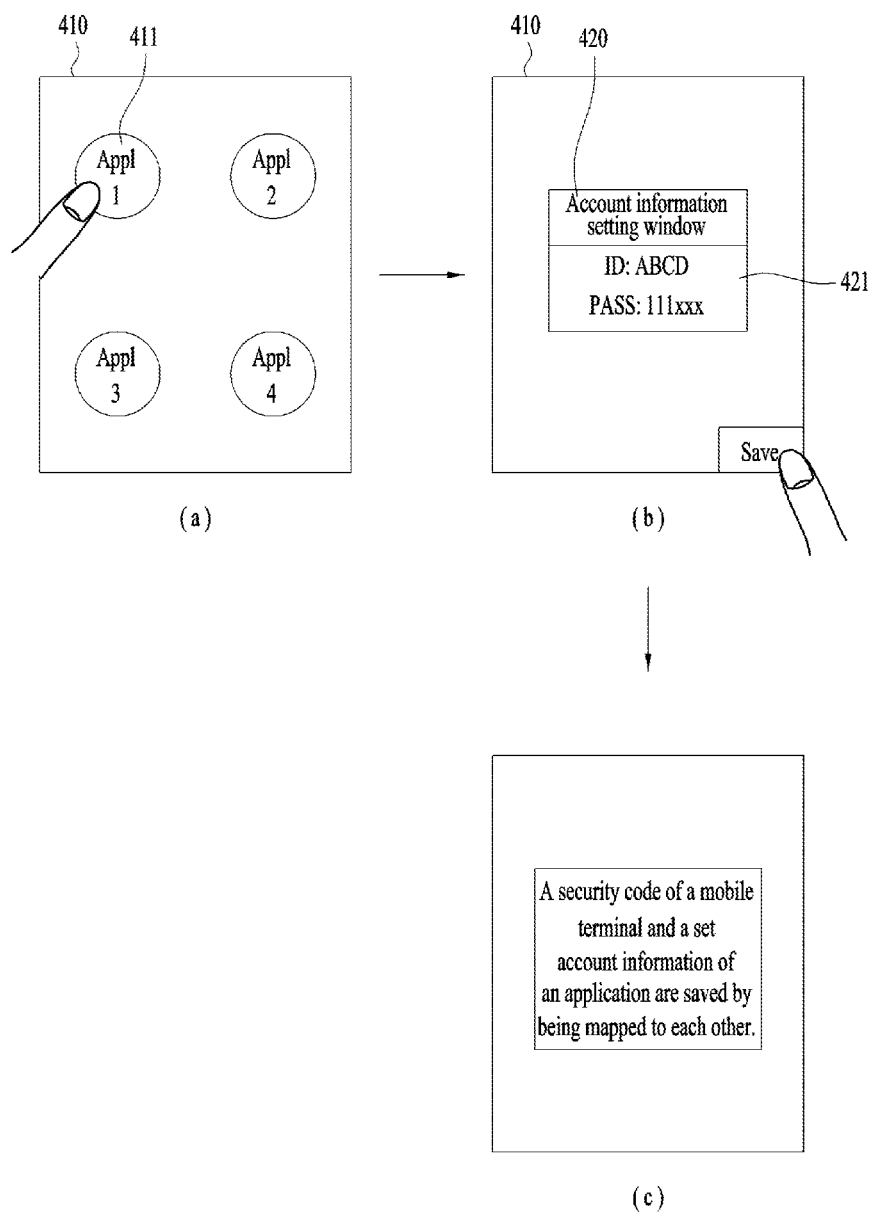
FIG. 13 is a diagram to describe a process for setting a user account information of a mobile terminal for logging in to at least one application installed on a smart device in a mobile terminal according to a second embodiment of the present invention.

First of all, with reference to FIG. 12 and FIG. 13, a process for setting a user account information of the mobile terminal 100 for a login of at least one application, which is installed on the smart device 700, within the mobile terminal 100 is described in detail.

FIG. 12 is a flowchart of a process for setting a user account information of a mobile terminal for logging in to at least one application installed on a smart device in a mobile terminal according to a second embodiment of the present invention.

FIG. 13 is a diagram to describe a process for setting a user account information of a mobile terminal for logging in to at least one application installed on a smart device in a mobile terminal according to a second embodiment of the present invention.

Referring to FIG. 12 and FIG. 13, while the controller 180 of the mobile terminal 100 is connected to a specific network currently accessed by the smart device 700 through the wireless communication unit 110, if the mobile terminal 100 is initially paired with the smart device 700 [S310], the controller 180 sends a request signal for an information related to a list of applications installed on the smart device 700 to the smart device 700 through the wireless communication unit 710 and then receives the information related to the list of the applications installed on the smart device 700 from the smart device 700 in response to the request signal [S320].

In this case, the specific network may include one of a Wi-Fi network, a DLNA network, a Bluetooth network, a Zigbee network, an NGS network, a DLNA (digital living network alliance) network, and an NFC (near field communication) network.

The controller 180 displays the list of the applications installed on the smart device 700 on the screen of the display unit 151 using the received list related information. If an account information used for a login of at least one application in the list is set [S330], the controller 180 creates a security code to send to the smart device 700 [S340].

Subsequently, the controller 180 sends the created security code to the smart device 700 through the wireless communication unit 110 in order for the smart device 700 to save the created security code [S350], maps the created security code and the set account information to each other [S360], and then saves the mapped security code and account information to the memory 160.

For instance, if the controller 180 displays a list 410 of objects (e.g., icons), which are provided to execute applications installed on the smart device 700, on a screen of the display unit 151 and at least one object 411 is then selected from the displayed objects [FIG. 13 (a)], the controller 180 displays a setting window 420, which is provided to set an account information to use for a login of an application corresponding to the selected object 411, on the screen [FIG. 13 (b)].

If an account information 421 to be used for the login of the application corresponding to the selected object 411 is set through the setting window 420 by the user of the mobile terminal 100, as shown in FIG. 13 (c), the controller 180 maps the created security code and the set account information 421 to each other and then saves them to the memory 160. In this case, the account information 421 may include at least one or two of an ID, a password, an email address, a phone number, and a resident registration number of the user.

Meanwhile, the controller 180 encrypts the created security code in a preset manner for hacking prevention before sending the created security code to the smart device 700 and is then able to send the encrypted security code to the smart device 700. In particular, the memory 730 of the smart device 700 is equipped with a decryption information for decryption of the encrypted security code, and the smart device 700 is able to decrypt the security code received from the mobile terminal 100 using the decryption information.

In the following description, with reference to FIG. 14, a process for automatically logging in to at least one application of the smart device 700 using the mobile terminal 100 according to the present invention is described in detail.

Figure 14:
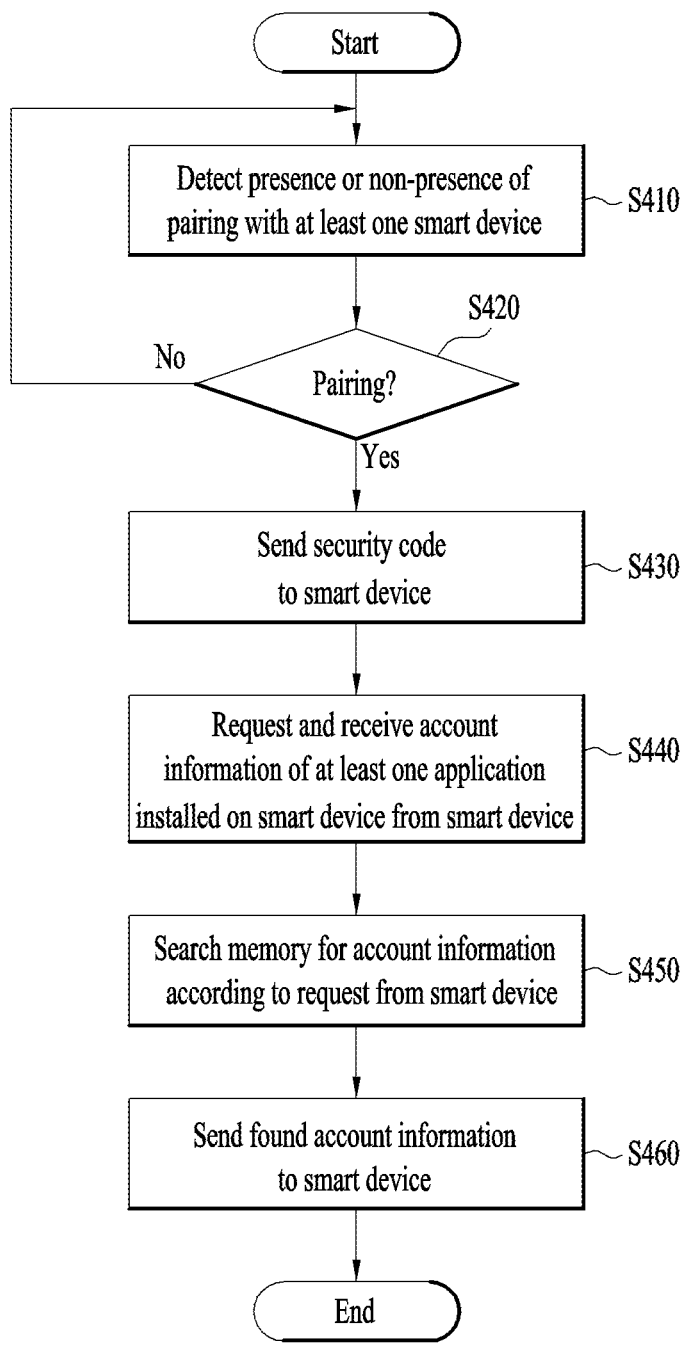
FIG. 14 is a flowchart of a process for automatically logging in to at least one application of a smart device using a mobile terminal according to a second embodiment of the present invention.

FIG. 14 is a flowchart of a process for automatically logging in to at least one application of a smart device using a mobile terminal according to a second embodiment of the present invention.

Referring to FIG. 14, the controller 180 of the mobile terminal 100 detects whether the mobile terminal 100 100 is paired with at least one smart devices 700 [S410]. If the mobile terminal 100 is currently paired with the at least one smart device 700 [S420], the controller 180 of the mobile terminal 100 sends the security code created by the process shown in FIG. 12 to the paired smart device 700 through the wireless communication unit 110.

In particular, if an attempt to log in to at least one application requiring a login among applications installed on the smart device 700 is detected from the smart device 700 or an execution command of the at least one application requiring the login is inputted, a request signal for the security code can be received from the smart device 700.

Moreover, the controller 180 encrypts the created security code in a preset manner for hacking prevention before sending the created security code to the smart device 700 and is then able to send the encrypted security code to the smart device 700. In particular, the memory 730 of the smart device 700 is equipped with a decryption information for decryption of the encrypted security code, and the smart device 700 is able to decrypt the security code received from the mobile terminal 100 using the decryption information.

After sending the security code to the smart device 700, if a request signal for an account information for a login of at least one application installed on the smart device 700 is received from the smart device 700 through the wireless communication unit 110 [S440], the controller 180 searches the account informations saved in the memory 160 by FIG. 12 and FIG. 14 for the account information according to the request signal [S450].

Subsequently, the controller 180 sends the found account information to the smart device 700 in order for the smart device 700 to automatically log in to the application corresponding to the found account information [S460].

Meanwhile, if an account information according to the request signal fails to exist in the account informations saved in the memory 160, the controller 180 displays an input window of an account information of an application requested by the smart device 700 on the screen of the display unit 151 and is then able to send the account information inputted through the input window to the smart device 700.

Moreover, while the smart device 700 automatically logs in to the application corresponding to the found account information by the step S460, if it is detected that the pairing with the smart device 700 is released through the wireless communication unit 110, the controller 180 sends a signal for commanding a logout of the application to the smart device 700 through the wireless communication unit 110 so that the smart device 700 can log out from the application.

So far, the second embodiment of the present invention is described in detail with reference to FIGS. 12 to 14.

In the following, a third embodiment of the present invention is described in detail with reference to FIGS. 15 to 17.

Third Embodiment

According to a third embodiment of the present invention, a following process is described as follows. First of all, in the mobile terminal 100, a user account information for a login of at least one application installed on the smart device 700 is administered. If the mobile terminal 100 is paired with the smart device 700, the account information is sent to the smart device 700 in order for the smart device 700 to log in to a corresponding application installed on the smart device 700 using the account information.

A third embodiment of the present invention is described in detail with reference to FIGS. 15 to 17 as follows.

Figure 15:
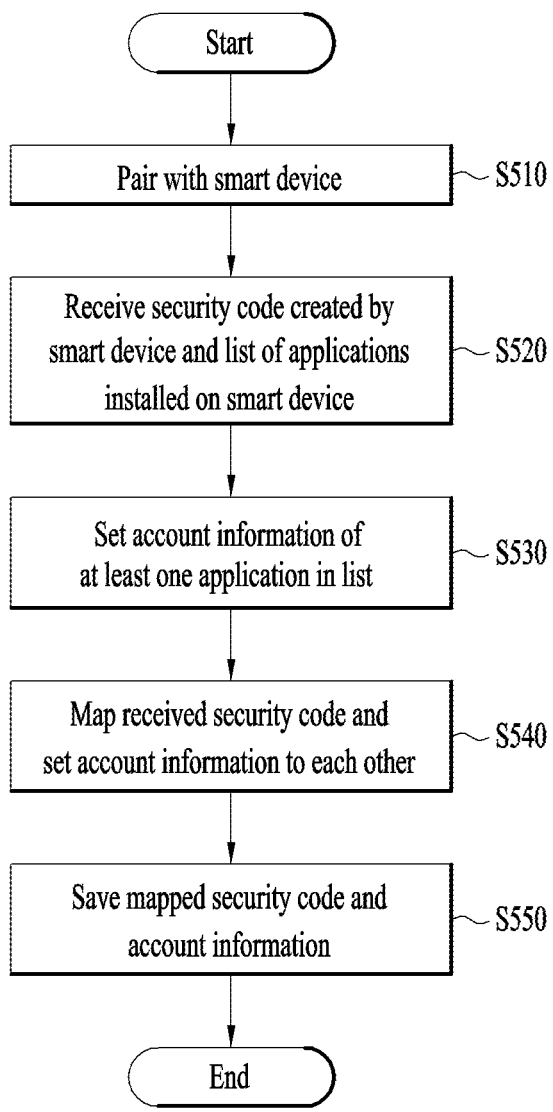
FIG. 15 is a flowchart of a process for setting a user account information of a mobile terminal for logging in to at least one application installed on a smart device in a mobile terminal according to a third embodiment of the present invention.
Figure 16:
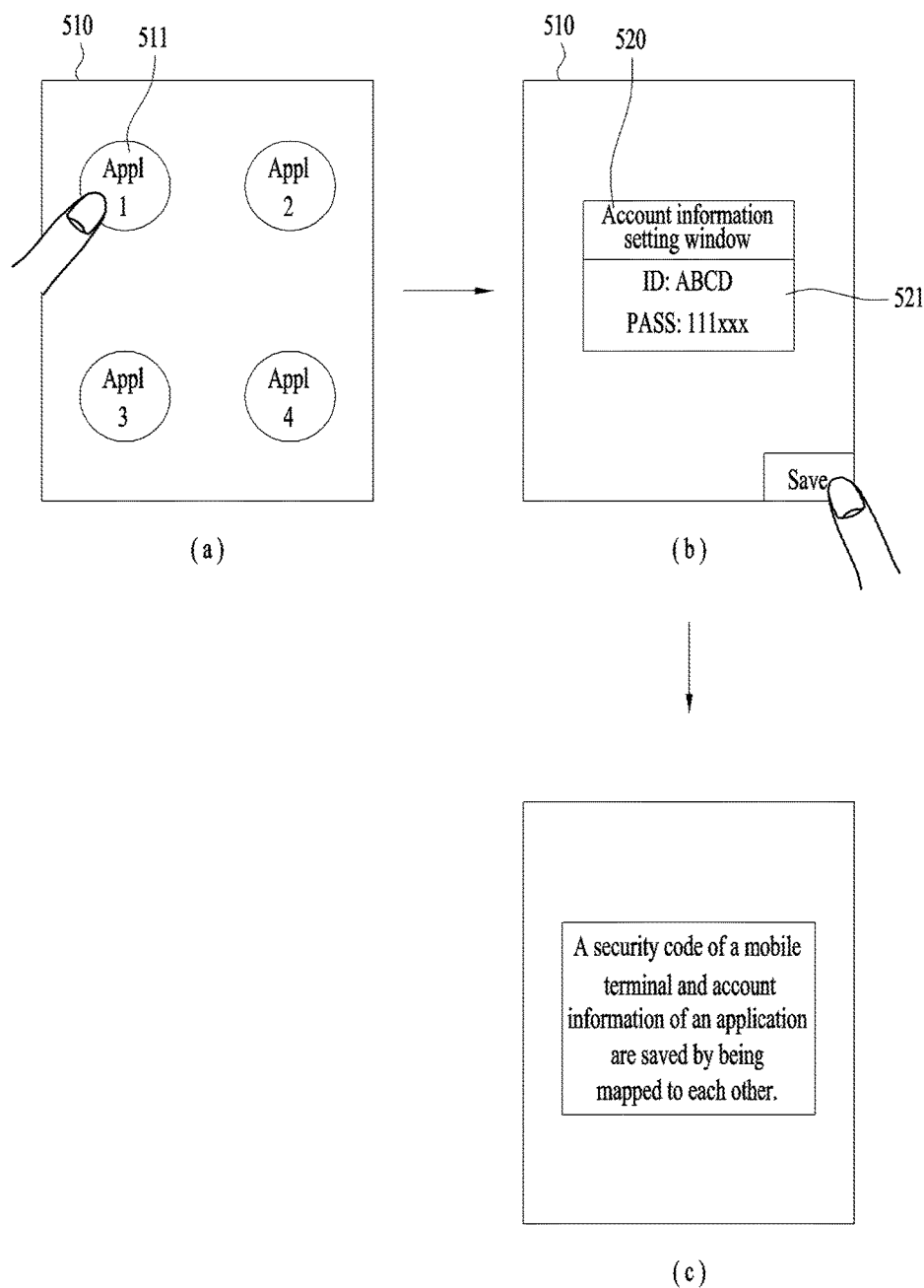
FIG. 16 is a diagram to describe a process for setting a user account information of a mobile terminal for logging in to at least one application installed on a smart device in a mobile terminal according to a third embodiment of the present invention.

First of all, with reference to FIG. 15 and FIG. 16, a process for setting a user account information of the mobile terminal 100 for a login of at least one application, which is installed on the smart device 700, within the mobile terminal 100 is described in detail.

FIG. 15 is a flowchart of a process for setting a user account information of a mobile terminal for logging in to at least one application installed on a smart device in a mobile terminal according to a third embodiment of the present invention.

FIG. 16 is a diagram to describe a process for setting a user account information of a mobile terminal for logging in to at least one application installed on a smart device in a mobile terminal according to a third embodiment of the present invention.

Referring to FIG. 15 and FIG. 16, while the controller 180 of the mobile terminal 100 is connected to a specific network currently accessed by the smart device 700 through the wireless communication unit 110, if the mobile terminal 100 is initially paired with the smart device 700 [S510], the controller 180 sends a request signal for a security code and an information related to a list of applications installed on the smart device 700 to the smart device 700 through the wireless communication unit 710 and then receives the security code and the information related to the list of the applications installed on the smart device 700 from the smart device 700 in response to the request signal [S520].

In this case, the specific network may include one of a Wi-Fi network, a DLNA network, a Bluetooth network, a Zigbee network, an NGS network, a DLNA (digital living network alliance) network, and an NFC (near field communication) network.

The controller 180 displays the list of the applications installed on the smart device 700 on the screen of the display unit 151 using the received list related information. If an account information used for a login of at least one application in the list is set [S330], the controller 180 maps the received security code of the smart device 700 and the set account information to each other [S240], and then saves the mapped security information and account information to the memory 160 [S250].

For instance, if the controller 180 displays a list 510 of objects (e.g., icons), which are provided to execute applications installed on the smart device 700, on a screen of the display unit 151 and at least one object 511 is then selected from the displayed objects [FIG. 16 (a)], the controller 180 displays a setting window 520, which is provided to set an account information to use for a login of an application corresponding to the selected object 511, on the screen [FIG. 16 (b)].

If an account information 521 to be used for the login of the application corresponding to the selected object 511 is set through the setting window 520 by the user of the mobile terminal 100, as shown in FIG. 16 (c), the controller 180 maps the received security code of the smart device 700 and the set account information 421 to each other and then saves them to the memory 160. In this case, the account information 421 may include at least one or two of an ID, a password, an email address, a phone number, and a resident registration number of the user.

In the following description, with reference to FIG. 17, a process for automatically logging in to at least one application of the smart device 700 using the mobile terminal 100 according to the present invention is described in detail.

Figure 17:
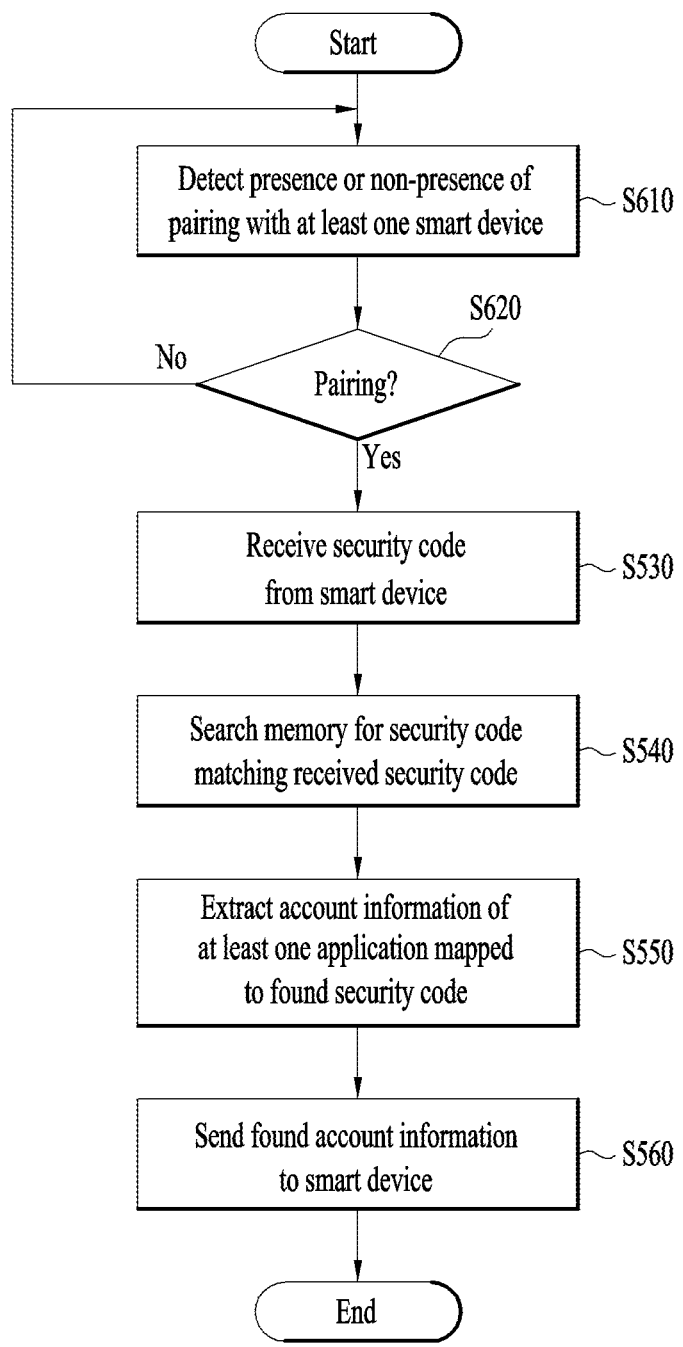
FIG. 17 is a flowchart of a process for automatically logging in to at least one application of a smart device using a mobile terminal according to a third embodiment of the present invention.

FIG. 17 is a flowchart of a process for automatically logging in to at least one application of a smart device using a mobile terminal according to a third embodiment of the present invention.

Referring to FIG. 17, the controller 180 of the mobile terminal 100 detects whether the mobile terminal 100 100 is paired with at least one smart devices 700 [S610]. If the mobile terminal 100 is paired with the at least one smart device 700 [S620], the controller 180 of the mobile terminal 100 receives a security code created by the smart device 700 from the paired smart device 700 through the wireless communication unit 110 [S630]. In doing so, the controller 180 may receive the security code of the smart device 700 by making a request for the security code to the paired smart device 700.

If the security code is received from the smart device 700, the controller 180 searches the security codes saved in the memory 160 by the processes shown in FIG. 15 and FIG. 16 for a security code matching the received security code [S640].

Subsequently, the controller extracts an account information mapped to the found security code from the memory 160 [S650] and then sends the extracted account information to the smart device 700 through the wireless communication unit 110 in order for the smart device 700 to perform a login operation on the corresponding application using the extracted account information.

Meanwhile, while the smart device 700 automatically logs in to the application corresponding to the found account information by the step S660, if it is detected that the pairing with the smart device 700 is released through the wireless communication unit 110, the controller 180 sends a signal for commanding a logout of the application to the smart device 700 through the wireless communication unit 110 so that the smart device 700 can log out from the application.

It will be apparent to those skilled in the art that various modifications and variations can be made in the present invention without departing from the spirit or scope of the inventions.

Thus, it is intended that the present invention covers the modifications and variations of this invention provided they come within the scope of the appended claims and their equivalents.

What is claimed is:

1. A first device, comprising:
a display unit configured to display information;
a wireless communication unit configured to perform a communication by being paired with a second device;
a memory configured to store at least one application; and
a controller configured to:
if the first device is initially paired with the second device, control the display unit to display at least one icon corresponding to the stored at least one application,
when the displayed at least one icon is selected, control the wireless communication unit to transmit a first signal for requesting an account information for a login of the at least one application corresponding to the selected at least one icon and a first security code to the paired second device,
when the account information and the first security code are received from the paired second device via the wireless communication unit, store the received account information and the received first security code to the memory by mapping the received account information and the received first security code to each other, if the first device is re-paired with the second device, control the wireless communication unit to transmit a second signal for requesting a second security code to the re-paired second device, receive the second security code from the re-paired second device via the wireless communication unit, and when the second security code is identical to the stored first security code, automatically log in to the at least one application using the stored account information mapped to the stored first security code, wherein:

when paired with the second device and a third device, the controller requests the second security code to either the second device or the third device based on a preset rank and receives the requested second security code, and the preset rank includes at least one of a rank in a count of pairing with each of the second device and the third device, a rank in a paired time with each of the second device and the third device, a rank in a sustained time of the pairing with each of the second device and the third device, or a priority preset for one of the second device and the third device by a user of the first device.

2. The first device of claim 1, wherein:

each of the first security code and the second security code includes at least one of an electronic serial number of the second device, a code set by a user of the second device, or a password set for the second device.

3. The first device of claim 1, wherein:

the second security code is an encrypted code, the memory is further equipped with a decryption information for decryption of the encrypted second security code, and when the encrypted second security code is received, the controller decrypts the encrypted second security code using the decryption information.

4. The first device of claim 1, wherein:

although a security code matching the received second security code exists among security codes saved in the memory, if the account information is not mapped to the matched security code, the controller requests an account information of an application corresponding to the selected object to the second device via the wireless communication unit.

5. The first device of claim 1, wherein:

the controller receives an account information of a specific application among the at least one application and the second security code from the second device via the wireless communication unit, and when the second security code corresponds to the first security code, the controller automatically logs in to the specific application using the received account information.

6. The first device of claim 5, wherein:

the controller saves the received account information of the specific application and the received second security code to the memory by mapping the received account information of the specific application and the received second security code to each other.

7. The first device of claim 1, wherein:

when paired with the second device and the third device, the controller causes the display unit to display a setting window for setting a device to which the second security code will be requested on the display unit, and the controller requests the second security code to the device selected from the second device and the third device via the setting window and receives the second security code from the selected device.

8. The first device of claim 7, wherein:

the controller cause the display unit to display a first item indicating the second device and a second item indicating the third device within the setting window in a manner of distinguishing the first item and the second item from each other for preset ranks.

9. The first device of claim 1, wherein:

when the second device is in a security mode, the controller inquires of the second device whether to log in to the application before logging in to the application and the controller logs in to the application according to a result of a response to the inquiry from the second device.

10. A method of controlling a first device, the method comprising:

if the first device is initially paired with a second device, displaying at least one icon corresponding to at least one application installed in the first device;

when the displayed at least one icon is selected, transmitting a first signal for requesting an account information for a login of at least one application corresponding to the selected at least one icon and a first security code to the paired second device;

when the account information and the first security code are received from the paired second device, storing the received account information and the received first security code in a memory by mapping the received account information and the received first security code to each other;

if the first device is re-paired with the second device, transmitting a second signal for requesting a second security code to the re-paired second device;

receiving the second security code from the re-paired second device; and when the second security code is identical to the first security code, automatically logging in to the at least one application using the account information mapped to the stored first security code, wherein:

when paired with the second device and a third device, the method further comprises requesting the second security code to either the second device or the third device based on a preset rank and receives the requested second security code, and the preset rank includes at least one of a rank in a count of pairing with each of the second device and the third device, a rank in a paired time with each of the second device and the third device, a rank in a sustained time of the pairing with each of the second device and the third device, or a priority preset for one of the second device and the third device by a user of the first device.

* * * * *